United States Patent
Lovitz

[15] 3,678,899
[45] July 25, 1972

[54] SHRIMP HATCHERY

[72] Inventor: David D. Lovitz, Short Hills, N.J.

[73] Assignee: Sternco Industries, Inc., Harrison, N.J.

[22] Filed: April 1, 1971

[21] Appl. No.: 130,321

[52] U.S. Cl. ..................................................119/2
[51] Int. Cl. ......................................A01k 61/00
[58] Field of Search ...............................119/2, 3, 5

[56] References Cited

UNITED STATES PATENTS

| | | | |
|---|---|---|---|
| 2,920,606 | 1/1960 | Anderson | 119/2 |
| 3,413,957 | 12/1968 | Steiner | 119/3 |
| 3,604,395 | 9/1971 | Huslin | 119/2 |

Primary Examiner—Aldrich F. Medbery
Attorney—Emanuel R. Posnack

[57] ABSTRACT

A hatchery for producing baby shrimp to be used as fish food in home aquariums. A water container has a removable cover with a central aperture from which an annular wall extends downwardly into the interior of the container, the bottom of the wall releasably supporting a two-part pick-up cup comprising a housing and therebelow a separable closure trap attached to a hand manipulable stem extending up through said housing, said annular wall and cover aperture. The assembly is placed under a light, and the closure trap permitted to drop to the base of the container, thereby leaving a space between the housing and the trap. Shrimp eggs that were placed in the partially filled container hatch, and the baby shrimp, attracted to the light seen through the bottom of the housing, swim toward the light, through said space and up into the housing, whereafter the stem is raised to lift the closure trap into engagement with the bottom of the housing, thereby trapping the shrimp. The two-part pick-up cup is then lifted out of the container and transferred to an aquarium, the shrimp being released, for use as fish food, by lowering the stem to separate the trap from the housing and dipping the separated trap into the aquarium water.

11 Claims, 10 Drawing Figures

Patented July 25, 1972
3,678,899
3 Sheets-Sheet 1
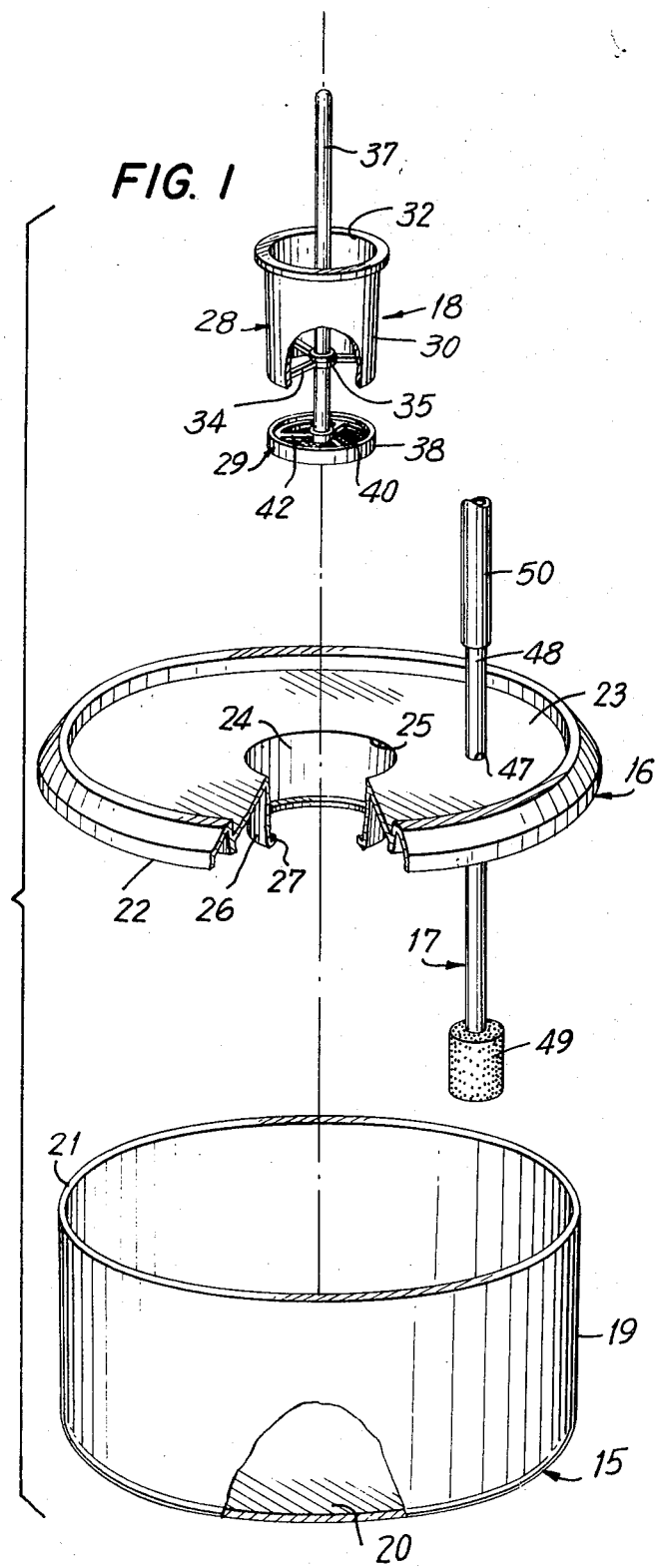
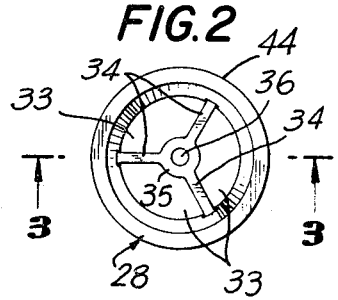
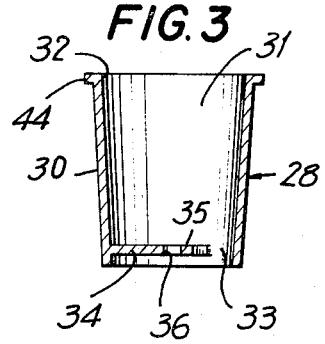
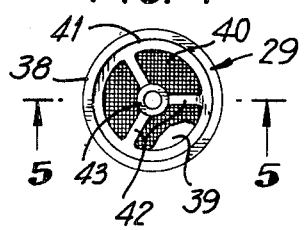
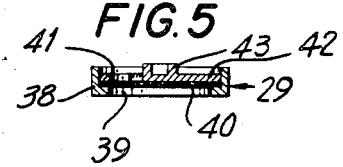
INVENTOR.
DAVID D. LOVITZ
BY Emanuel R. Posnack
ATTORNEY Patented July 25, 1972
3,678,899
3 Sheets-Sheet 2
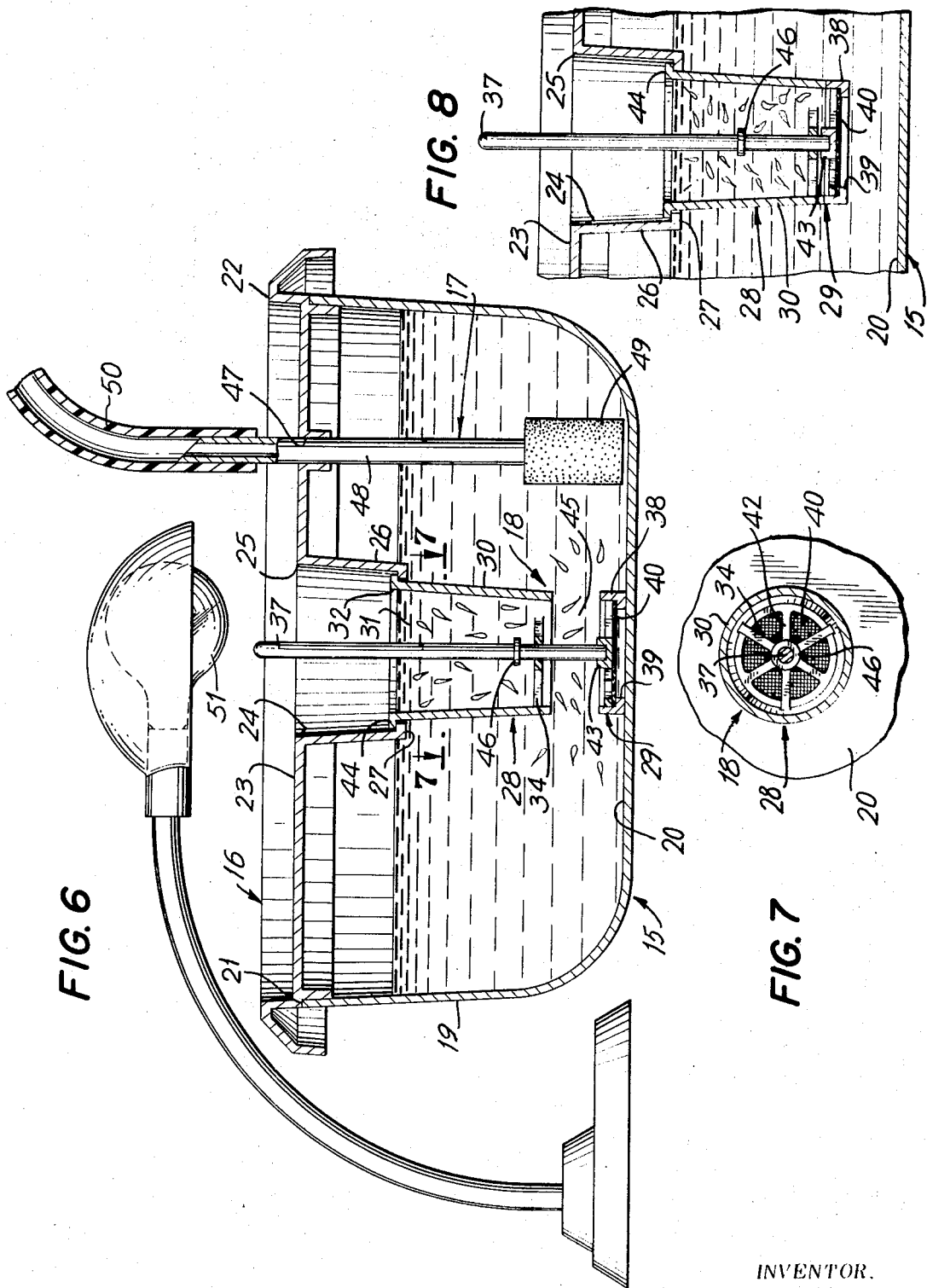
INVENTOR.
DAVID D. LOVITZ
BY Emanuel R. Posnack
ATTORNEY Patented July 25, 1972

INVENTOR.
DAVID D. LOVITZ

BY Emanuel R. Posnack

ATTORNEY

3,678,899

SHRIMP HATCHERY

THE FIELD OF THE INVENTION

This invention relates to shrimp hatcheries, and is directed particularly to hatcheries for producing baby brine shrimp to be used as fish food in home aquariums.

BACKGROUND OF THE INVENTION

The Known Art

The common method of hatching shrimp eggs for use as aquarium fish food is to place the eggs — often combined with a special pre-mix of hatchery ingredients — into a salt water solution, then aerating the water with an airstone or other suitable means connected to an air pump and placing an electric light bulb above the surface of the water. After a period of time the baby shrimp begin to hatch and immediately swim toward the region of the light, at which point they are scooped up by a net, cup, syphon or other suitable means. This method is both tedious and difficult, at times requiring special manipulative skills; and it is also inefficient in that the hatched shrimp are not always in the best positions relative to the light and hence difficult to collect. This common method is also hazardous for the collected shrimp while being transferred to an aquarium, in that they are subject to the danger of drafts. In attempts to improve over this conventional hatching method various hatchery devices have been employed, these generally having a special covered container for the salt solution with an electric light bulb placed over an opening in the cover, such containers having various internal arrangements of paths for the newly hatched shrimp swimming towards the light. It has been found that such hatchery devices are often only complicated and expensive, but also inefficient in that the light from the bulb is diffused and not directed to an area where the shrimp can concentrate in large numbers. Moreover, in certain of such known devices a shrimp collecting cup is employed that is so constructed and positioned within the hatchery that the shrimp deposited therein are mostly the ones that happen to drop into the cup from above, since the shrimp cannot enter the cup from its base, thereby resulting in less than an optimum catch. Furthermore, in such devices the aerating means, such as an air stone, must be manually positioned within the container, often a time-consuming and messy job. It has also been found that with the conventional cup type of shrimp collector, the transfer of the shrimp to the aquarium requires very careful manipulation in dumping the trapped shrimp into the aquarium water, the hand holding the cup often being immersed in the water in the process.

Objects Of The Invention

It is the objective of this invention to provide an efficient hatchery device of the above-mentioned category having none of the aforesaid shortcomings of known hatchery methods and devices. Among the specific objects are the provision of a hatchery container with a shrimp pick-up region of concentrated light to attract a large collection of baby shrimp; the provision of an elongated open-ended pick-up housing the interior chamber of which constitutes said region of concentrated light, whereby the shrimp can swim upwardly through the bottom opening of the housing into said interior chamber thereof towards the light source; the provision of a manually movable bottom closure trap for trapping the shrimp within the housing and enabling the trapped fish to be readily transferred in sheltered condition to an aquarium and dispersed within the water thereof without dipping the hands in the water; and the provision of an air line pipe, connected to an aeration unit positionable in optimum relation to the hatchery container without manual adjustment. And it is within the further contemplation of this invention to provide a hatchery device having the aforesaid advantages and that is relatively simple in construction, low in cost and easy to handle.

Other objects, features and advantages will appear from the drawings and the description hereafter given.

SUMMARY OF THE INVENTION

The hatchery of this invention comprises a container for a salt water solution with a removable cover having a central aperture from the periphery of which there extends downwardly a laterally enclosed wall the bottom of which has a narrow inwardly extending flange defining a bottom opening. A two-part pick-up cup for collecting and trapping the baby shrimp is employed, this comprising an open-ended housing with an upper outwardly extending peripheral lip adapted to overlap and be supported by said flange, and a closure trap with a screen base below and in separable engagement with the bottom periphery of said housing, said trap being attached to an upwardly extending stem adapted for manual grasping, so that the closure trap could be brought into operative engagement with and separated from said housing. The cover also has an apertured portion through which extends a vertical air line pipe adapted for connection to a suitable air pump line, the bottom of the pipe carrying an air stone so positioned that when the cover is operatively in place the air stone rests upon the base of the container—the optimum position for aeration.

The device is placed with the cover's central aperture under a suitable electric light bulb, so that the light thereof is concentrated within said housing. When the stem is released the closure trap will gravitationally separate from the housing and come to rest upon the base of the container. In this position there is a space between the housing and the trap, so that newly hatched shrimp, attracted by the light visible through the bottom of the housing, will enter said space and swim upwardly and directly into the interior chamber of the housing. The stem is then lifted to bring the closure trap into engagement with the bottom of the housing to form an assembled pick-up cup which can be lifted up by said stem through said laterally enclosed wall and the cover's said aperture, whereafter the trapped shrimp can be transferred to an aquarium. To empty the cup with the trapped shrimp therein into the aquarium water, the closure trap is lowered into the water by manipulating the stem to separate it from the housing, thereby releasing the shrimp and permitting them to swim away and serve as fish food.

DESCRIPTION OF THE DRAWINGS

FIG. 1 is an exploded perspective view of the components of one form of this invention, parts being broken away for clarity.

FIG. 2 is a plan view of the housing component of the two-part pick-up cup.

FIG. 3 is a section of FIG. 2 taken substantially along line 3—3.

FIG. 4 is a plan view of the closure trap component of the two-part pick-up cup.

FIG. 5 is a section of FIG. 4 taken substantially along line 5—5.

FIG. 6 is a vertical medial section of the device in assembled position shown disposed below an electric light bulb and in operative position with the housing and closure trap components in separated relation, the container being shown with water therein and newly hatched shrimp swimming towards and into the housing component.

FIG. 7 is a section of FIG. 6 taken along line 7—7.

FIG. 8 is a fragmentary section like FIG. 7, but showing the closure trap in operative closure position.

DESCRIPTION OF THE PREFERRED EMBODIMENT

Figure 9:
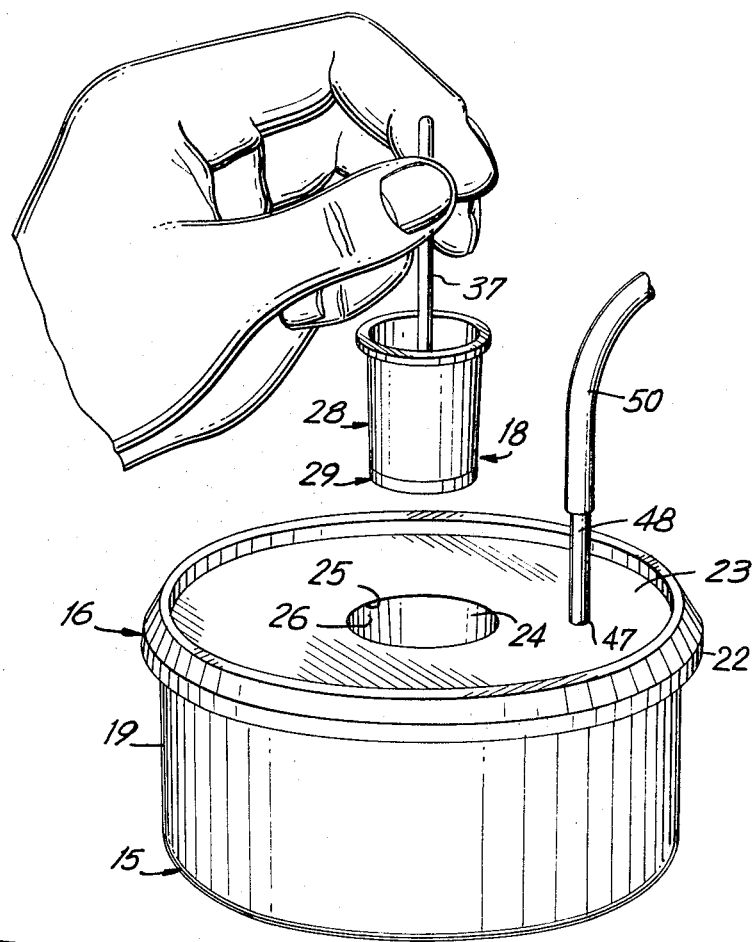
FIG. 9 is a perspective view of the hatchery container and the pick-up cup just after the latter has been lifted up from the hatchery container by a hand grasping the pick-up stem.

The form of this invention illustrated in the drawings comprises the hatchery container 15 with 16, the aerating means 17 attached to the cover, and the two-part pick-up cup 18. The said container, adapted to contains therein a salt water solution to a predetermined level, is open at the top and comprises the annular wall 19 and the base 20, the upper rim 21 of said annular wall being proportioned to removably receive thereover the peripheral portion 22 of the cover 16 in known manner. The said cover has a flat top wall 23 embraced by said peripheral portion 22 and containing the central aperture 24 from the periphery 25 of which there extends downwardly the annular wall 26 the bottom of which has a narrow inwardly extending retaining flange 27 for releasably supporting the pick-up cup hereinbelow described.

The said pick-up cup 18 comprises the relatively deep housing 28 and the shallow closure trap 29 movably positioned between an upper operative position in engagement with the bottom of said housing (FIGS. 8 and 9) and a lower inoperative position spaced below the housing and preferably resting upon the base 20 of the container 15 (FIG. 6). In the particular construction illustrated the housing 28 is open-ended, the laterally enclosed annular wall 30 defining relatively high inner chamber 31 with opening 32 at the top and open portions 33 at the bottom between the radial arms 34 and the said annular wall 30. The said radial arms 34 are joined to and support the central hub 35 with the axial passageway 36 through which the pick-up stem 37 slidably extends, said stem being affixed to the said closure trap 29 for raising and lowering said trap by manual manipulation. Said closure trap comprises the cup-shaped shell 38 with the apertured base 39 overlaid by the screen 40 which is held in place by the retainer ring 41 cemented to the lateral wall of said member 38, said ring 41 having having radial arms 42 joined to the hollow boss 43 into which said stem 37 extends and is fixedly secured in place.

The upper periphery of said pick-up housing 28 has the outwardly extending peripheral lip 44 proportioned for overlapping engagement with said inwardly extending flange 27 of the said annular wall 26 of the cover member 16, so that the pick-up cup 18 is supported in operative position by said flange 27. It is preferred that said pick-up stem 37 be of a length to extend above the cover 16 when the closure trap 29 is resting in its inoperative position on the floor 20 of the container, as shown in FIG. 6, thereby to enable the upper portion of the stem to be readily grasped. It is to be noted that because the said annular wall 26 extends downwardly into the interior of the container 15, the retainer flange 27 is disposed intermediate the cover 16 and the base 20 of the container at a sufficiently low level so that the bottom of the supported housing 28 is not too remote from the closure trap 29 when the latter is resting upon the said base 20. In other words, the arrangement is such that the space 45 between the housing 28 and closure trap 29, though sufficient to admit shrimp therein, is conveniently small enough to permit a quick closing movement of the closure trap 29 for engagement with the bottom of the housing 28 to effectively trap shrimp swimming within the housing. It is further to be noted that said stem 37 has a stop element 46 thereon engageable with said hub 35 at the bottom of said housing 28, thereby holding the said closure trap against disengagement from the housing.

Extending through and affixed to the apertured portion 47 of the wall 33 of said cover 16 is the aeration pipe 48, the bottom of the pipe being provided with a conventional air stone 49 and the top attached to tubing 50 connected to an air pump (not shown). In the preferred construction said pipe 45 is so positioned that when the cover 16 is operatively in place the air stone 49 is disposed upon the base 20 of the container 15, this being the optimum aerating position for this hatchery construction.

In the operative use of this device, the assembled unit is placed under an electric light lamp 51 of suitable wattage, with the bulb directly above said central aperture 24 of the cover 16, as illustrated in FIG. 6. Since the downwardly extending annular wall 26 is interengaged with the housing 28 of the two-part pick-up cup 18, the light from the bulb is concentrated within the interior of said annular wall and the inner chamber 31 of said housing, this region of concentrated light being visible through the said space 45 and the bottom apertures 33 of the housing, to attract newly hatches shrimp.

In the preferred order of steps in the operation of this hatchery, a pack of shrimp eggs is dispersed within the salt water solution within the container 15, the cover 16 placed in position, the pipe 45 connected to air tubing 50 and the connected air pump started to aerate the water through the air stone 49, whereafter the device is placed under the lamp 51 is aforesaid. After a while baby shrimp begin to hatch and will immediately be attracted to the region of concentrated light. They will swim directly to the space 45 and up through the openings 33 into the interior chamber 31 of the housing 28. Since the only source of light visible to the shrimp is that emitted from the bottom of the housing 28, that is the only area that will attract the shrimp. This single source of attraction, and the elongated proportions of the inner chamber 31, enable a large collection of shrimp to accumulate in the chamber.

To collect the accumulated shrimp, the stem 37 is lifted, thereby raising the closure trap 29 into engagement with the bottom of the housing 28 (see FIG. 8) and trapping the shrimp therein. Upon a further raising of said stem two-part pick-up cup 18 is removed from the container (see FIG. 9), the water within the cup draining through screen 40 back into the container. The withdrawal of said two-part cup 18 from the container can readily be effected since the transverse proportions of said annular wall 26 and said apertured portion 24 of the cover is greater than the transverse proportions of said pick-up cup 18.

Figure 10:
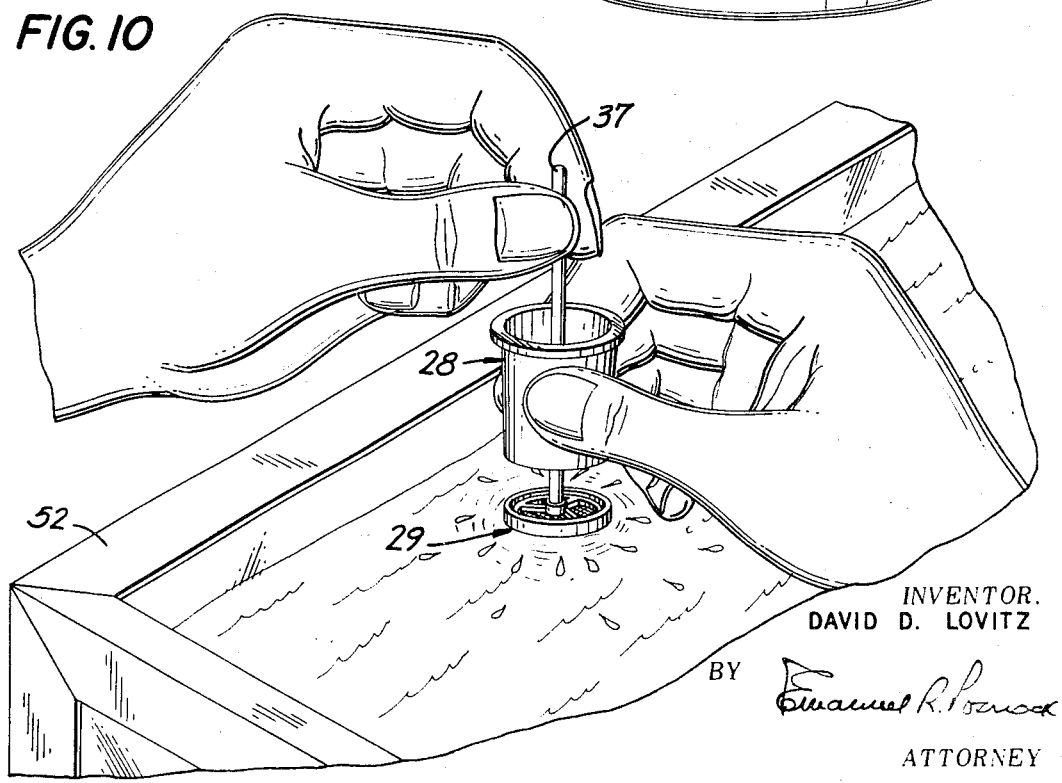
FIG. 10 is a fragmentary perspective view of an aquarium and the pick-up cup held by a pair of hands in the process of releasing the entrapped shrimp into the aquarium water, the housing and closure trap components of the cup being shown in separated positions.

The cup with its contents of live baby shrimp is then transferred to the aquarium 52 (FIG. 10), the delicate shrimp being protected by the deep housing 28. At the aquarium the stem 37 lowered with one hand while holding the housing 28 with the other to separate the trap from the housing, the trap being dipped into the water, whereupon the released shrimp will swim away to become live fish food. If any shrimp are left in the housing 28, the device could readily be inverted and, by grasping the closure trap 29 and dipping the housing proper into the water, any remaining shrimp could readily be released — operations that do not require the dipping of the hands into the water.

In the above description, the invention has been disclosed merely by way of example and in preferred manner, but obviously many variations and modifications may be made therein. It is to be understood, therefore, that the invention is not limited to any particular form or manner of practicing same.

I claim:

1. A shrimp hatchery for operative use with a light source, comprising a water container having an apertured upper portion for placement under said light source, a two-part pick-up cup removably positioned within said container beneath said apertured portion, and retaining means on said container for supporting said pick-up cup within said container, said pick-up cup comprising a housing with top and bottom openings and therebelow a closure trap movable between an operative position in engagement with the lower portion of said housing and an inoperative position separated therefrom and spaced therebelow, and manually manipulable means for moving said closure trap between its said operative and inoperative positions.

2. A shrimp hatchery according to claim 1, said container having a removable cover containing said apertured portion, said retaining means being carried by said cover.

3. A shrimp hatchery according to claim 2, said cover having a open-ended laterally enclosed annular wall extending downwardly into said container in registry with said apertured portion, said retaining means being disposed at the bottom portion of said annular wall.

4. A shrimp hatchery according to claim 3, said retaining means comprising a peripheral flange extending inwardly from said annular wall, said housing having at the upper portion thereof an outwardly extending peripheral lip proportioned and positioned for overlapping engagement with said peripheral flange.

5. A shrimp hatchery according to claim 1, said manually manipulable means comprising a stem attached to said closure trap and proportioned and positioned to extend upwardly through said housing and annular wall when said pick-up cup is operatively disposed within said container.

6. A shrimp hatchery according to claim 5, the bottom of said housing having central hub with a vertical passageway therein and a plurality of spaced radial arms connecting said hub to the lateral wall of said housing, said stem slidably extending through said passageway, the spaces between said radial arms constituting said bottom openings in said housing.

7. A shrimp hatchery according to claim 5, said closure trap comprising a cup-shaped shell with an apertured base, a screen overlying the base, and a hollow central boss open at the top, the bottom of said stem extending into and being affixed to said boss.

8. A shrimp hatchery according to claim 6, said stem having a stop element thereon engagable with said hub of the housing when said closure trap is separated therefrom a predetermined distance.

9. A shrimp hatchery according to claim 2, said cover having a horizontal wall carrying an aeration pipe, said pipe ectending through said latter wall, the bottom of said pipe having thereon an airstone, the top of the pipe being adapted for attachment to a suitable air line.

10. A shrimp hatchery according to claim 9, said stem having a stop element thereon engagable with the said hub of the housing when said closure trap is separated therefrom a predetermined distance, said pipe being so proportioned that its said airstone will be in engagement with the base of said container when said cover is operatively in place.

11. A shrimp hatchery according to claim 3, the transverse proportions of said annular wall and said apertured portion of said cover being greater than the transverse proportions of said pick-up cup, whereby said pick-up cup may be operatively withdrawn from said container through the interior of said annular wall and said apertured portion.

* * * * *